(12) United States Patent
Wright et al.

(10) Patent No.: US 11,496,698 B2
(45) Date of Patent: Nov. 8, 2022

(54) IMAGING AN OBJECT USING PROJECTED ELECTROMAGNETIC RADIATION AND A ROLLING SHUTTER

(71) Applicant: Nokia Technologies Oy, Espoo (FI)

(72) Inventors: Christopher Wright, London (GB); Wai Lau, London (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/471,005

(22) Filed: Sep. 9, 2021

(65) Prior Publication Data

US 2022/0086374 A1 Mar. 17, 2022

(30) Foreign Application Priority Data

Sep. 14, 2020 (EP) ..................................... 20195874

(51) Int. Cl.
*H04N 5/353* (2011.01)
*H04N 5/232* (2006.01)

(52) U.S. Cl.
CPC ......... *H04N 5/3532* (2013.01); *H04N 5/2329* (2013.01); *H04N 5/23267* (2013.01)

(58) Field of Classification Search
CPC ............. H04N 5/3532; H04N 5/23267; H04N 5/2329; G01N 21/3563; G01N 2021/473; G01N 2201/0221; G01N 21/474; G01N 21/49

See application file for complete search history.

(56) References Cited

U.S. PATENT DOCUMENTS

| | | | | |
|---|---|---|---|---|
| 2007/0177772 A1* | 8/2007 | Fujii | ...................... | G06V 40/45 382/115 |
| 2015/0053767 A1* | 2/2015 | Sackett | ............. | G06K 7/10722 235/462.06 |
| 2018/0344412 A1 | 12/2018 | Esterberg | | |
| 2019/0080153 A1 | 3/2019 | Kalscheur et al. | | |
| 2019/0174056 A1* | 6/2019 | Jung | .................. | H04N 5/23218 |

OTHER PUBLICATIONS

"Looking inside the body with indirect light", ScienceDaily, Retrieved on Sep. 3, 2021, Webpage available at : https://www.sciencedaily.com/releases/2019/10/191023093441.htm.

(Continued)

*Primary Examiner* — Yogesh K Aggarwal
(74) *Attorney, Agent, or Firm* — Harrington & Smith

(57) ABSTRACT

According to various, but not necessarily all, embodiments there is provided an apparatus comprising means for: capturing or causing capture of an image of an object using a rolling shutter having an aperture width and shutter scan speed; during the image capture, projecting or causing projection of electromagnetic radiation with a fixed-spatial, time-variable distribution onto the object, wherein the time-variable distribution of the projected electromagnetic radiation, the aperture width of the rolling shutter, and the shutter scan speed of the rolling shutter, are such that adjustment of one or more of these would not decrease a proportion of projected electromagnetic radiation captured which is directly reflected from a surface of the object.

17 Claims, 9 Drawing Sheets

(56) References Cited

OTHER PUBLICATIONS

Figure 1:
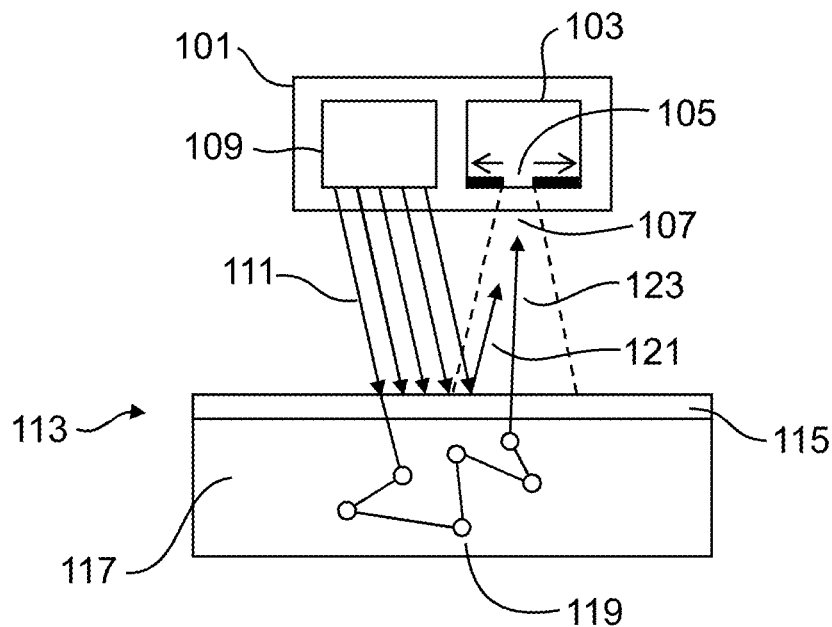

"The Ultimate Biometrics Breakdown: Face Recognition VS Palm Veins Scan", Vemini, Retrieved on Sep. 3, 2021, Webpage available at : https://medium.com/vemini/facial-recognition-vs-palm-veins-scan-the-ultimate-breakdown-1a811adf6819.

"2019 iPhones: Face ID will scan "Vein Patterns & Blood Vessels" to tell Identical Twin apart", Dignited, Retrieved on Sep. 3, 2021, Webpage available at : https://www.dignited.com/44567/2019-iphones-face-id-will-use-subepidermal-imaging-to-tell-identical-twin-apart/.

Miura et al., "Technology and Future Prospects for Finger Vein Authentication Using Visible-light Cameras", Latest Digital Solutions and Their Underlying Technologies, Hitachi Review, vol. 67, No. 5, 2018, pp. 62-70.

Kubo et al., "Programmable Non-epipolar Indirect Light Transport: Capture and Analysis", IEEE Transactions on Visualization and Computer Graphics, vol. 27, No. 4, Apr. 1, 2021, pp. 1-16.

Ueda et al., "Slope Disparity Gating Using a Synchronized Projector-camera System", IEEE International Conference on Computational Photography (ICCP), 2019, 9 pages.

Gupta et al., "Flexible Voxels for Motion-aware Videography", European Conference on Computer Vision, 2010, pp. 100-114.

Henderson et al., "Design and Calibration of a Fast Flying-dot Projector for Dynamic Light Transport Acquisition", IEEE Transactions on Computational Imaging, vol. 6, Jan. 6, 2020, pp. 1-15.

"LG's new smartphone unlocks by recognizing the veins in your palms — here's how it works", Business Insider, Retrieved on Sep. 3, 2021, Webpage available at : https://www.businessinsider.com/lg-g8-smartphone-unlocks-with-hand-id-vein-palm-recognition-2019-2?r=US&IR=T.

Extended European Search Report received for corresponding European Patent Application No. 20195874.1, dated Mar. 3, 2021, 12 pages.

* cited by examiner

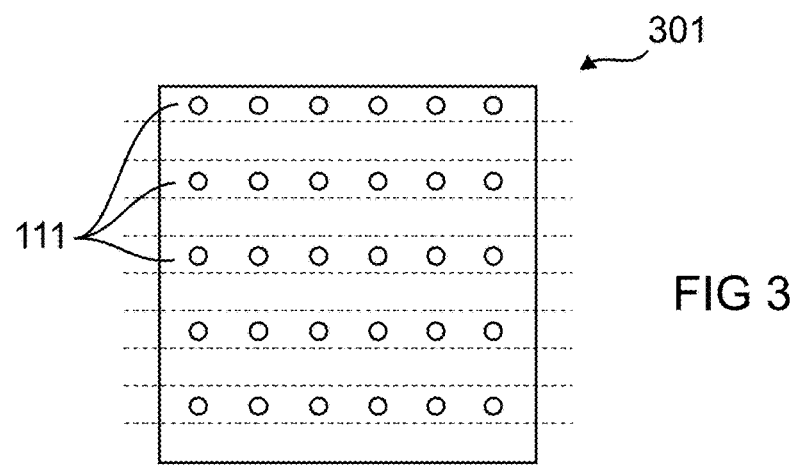
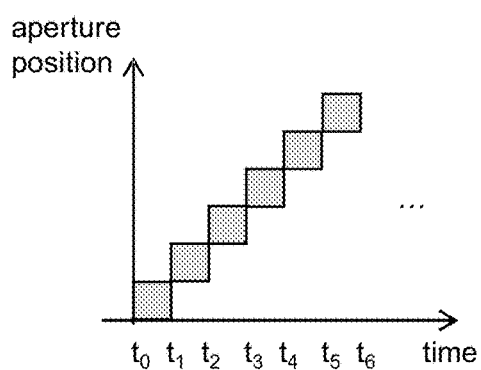
FIG 4A
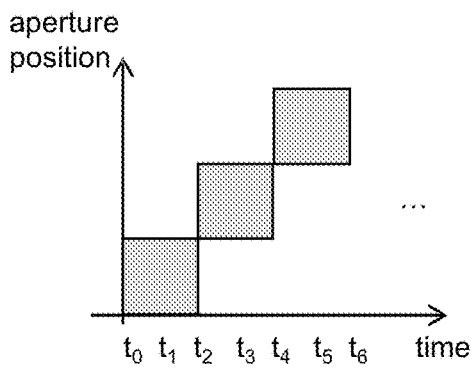
FIG 5A
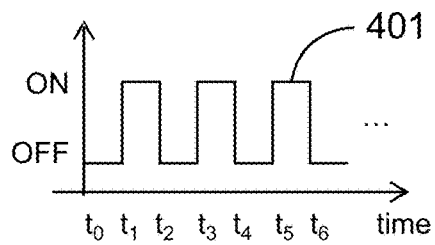
FIG 4B
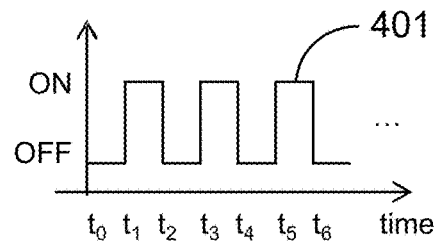
FIG 5B
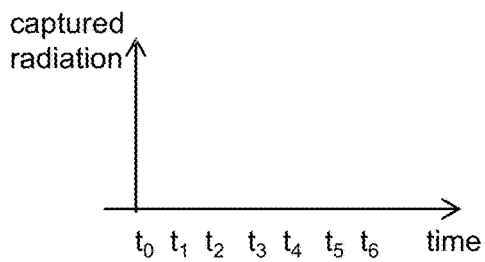
FIG 4C
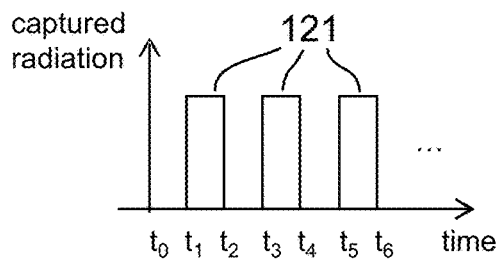
FIG 5C

IMAGING AN OBJECT USING PROJECTED ELECTROMAGNETIC RADIATION AND A ROLLING SHUTTER

TECHNOLOGICAL FIELD

Embodiments of the present disclosure relate to imaging an object using projected electromagnetic radiation and a rolling shutter. Some embodiments relate to imaging an object using projected electromagnetic radiation and a rolling shutter to enable information about the subsurface structure of the object to be obtained.

BACKGROUND

Information about the subsurface structure of an object can be obtained from electromagnetic radiation that has undergone subsurface scattering. However, when electromagnetic radiation is projected onto the object, the majority of it is directly reflected from the surface of the object. The captured signal is therefore dominated by directly reflected electromagnetic radiation and it is accordingly challenging to obtain information about the subsurface structure from the captured signal.

BRIEF SUMMARY

According to various, but not necessarily all, embodiments there is provided an apparatus comprising means for: capturing an image of an object using a rolling shutter having an aperture width and shutter scan speed; and, during the image capture, projecting electromagnetic radiation with a fixed-spatial, time-variable distribution onto the object. The time-variable distribution of the projected electromagnetic radiation, the aperture width of the rolling shutter, and the shutter scan speed of the rolling shutter, are such that adjustment of one or more of these would not decrease a proportion of projected electromagnetic radiation captured which is directly reflected from a surface of the object.

According to various, but not necessarily all, embodiments there is provided a method comprising: capturing an image of an object using a rolling shutter having an aperture width and shutter scan speed; and, during the image capture, projecting electromagnetic radiation with a fixed-spatial, time-variable distribution onto the object. The time-variable distribution of the projected electromagnetic radiation, the aperture width of the rolling shutter, and the shutter scan speed of the rolling shutter, are such that adjustment of one or more of these would not decrease a proportion of projected electromagnetic radiation captured which is directly reflected from a surface of the object.

According to various, but not necessarily all, embodiments there is provided a computer program that, when run on a computer, performs: causing capture of an image of an object using a rolling shutter having an aperture width and shutter scan speed; and, during the image capture, causing projection of electromagnetic radiation with a fixed-spatial, time-variable distribution onto the object. The time-variable distribution of the projected electromagnetic radiation, the aperture width of the rolling shutter, and the shutter scan speed of the rolling shutter, are such that adjustment of one or more of these would not decrease a proportion of projected electromagnetic radiation captured which is directly reflected from a surface of the object.

The following portion of this "Brief Summary" section, describes various features that may be features of any of the embodiments described in the foregoing portion of the 'Brief Summary' section. The description of a function should additionally be considered to also disclose any means suitable for performing that function.

At a given aperture position of the rolling shutter, electromagnetic radiation which is projected onto an area of the object outside a field of view from the aperture position and which has which has undergone subsurface scattering into the field of view may be captured.

The time-variable distribution of the projected electromagnetic radiation, the aperture width of the rolling shutter, and the shutter scan speed of the rolling shutter, may be set such that adjustment of one or more of these would not decrease the proportion of projected electromagnetic radiation captured which is directly reflected from a surface of the object.

The time-variable distribution and the shutter scan speed may be such that over periods of the time-variable distribution in which the electromagnetic radiation is not projected the change in the aperture position is less than or equal to twice a target lateral distance for scattering.

The time-variable distribution of the projected electromagnetic radiation may comprise a temporally-alternating distribution.

The time-variable distribution of the projected electromagnetic radiation may comprise strobing.

The strobing may comprise an on-cycle of equal duration with an off-cycle.

The time-variable distribution of the electromagnetic radiation may comprise a temporal offset from the beginning of the image capture.

The fixed-spatial distribution of the projected electromagnetic radiation may comprise a repeating pattern The time-variable distribution of the projected electromagnetic radiation, the aperture width of the rolling shutter, and the shutter scan speed of the rolling shutter may be controlled to: cause capture of first strips of the object when second strips, adjacent the first, are illuminated by denser regions of the repeating pattern; and cause capture of the second strips while the projection of the electromagnetic radiation is turned off.

The fixed-spatial distribution of the projected electromagnetic radiation may comprise a fixed distribution of dots.

The projected electromagnetic radiation may comprise one or more infrared frequencies.

The shutter scan speed of the rolling shutter may be constant during the image capture.

The aperture width of the rolling shutter may be constant during the image capture.

The time-variable distribution of the projected electromagnetic radiation, the aperture width of the rolling shutter, and the shutter scan speed of the rolling shutter, may be such that adjustment of one or more of these would not decrease the proportion of projected electromagnetic radiation captured which is directly reflected from one or more surfaces of one or more parts of the object which are of interest.

Multiple spatially-offset images of the object may be captured as a relative position of the apparatus and object varies.

The multiple spatially-offset images may be captured during jitter.

Two or more spatially-offset images may be fused into a combined image of the object which comprises less of the projected electromagnetic radiation directly reflected from a surface of the object than either of the two or more spatially-offset images.

Subsurface structure information obtained from the multiple spatially-offset images may be used to align the multiple spatially-offset images.

Multiple images of the object may be captured and, from one image capture to another, one or more of: a frequency of the projected electromagnetic radiation; an amplitude of the projected electromagnetic radiation; the time-variable distribution of the projected electromagnetic radiation; the aperture width of the rolling shutter; or the shutter scan speed of the rolling shutter, may be varied.

Surface properties of the object may be obtained. Based on the surface properties and a target depth of scattering and/or target lateral distance of scattering, a target frequency and/or amplitude for the projected electromagnetic radiation may be determined.

The target depth may be based on the type of object to be imaged.

The target lateral distance of scattering may be based on a distribution of illumination of the object by the projected electromagnetic radiation.

Determining the target frequency and/or amplitude for the projected electromagnetic radiation may be further based on a distance between the apparatus and the object and/or ambient lighting conditions.

Determining the target frequency and/or amplitude for the projected electromagnetic radiation may be further based on subsurface scattering properties of a material from which the object is composed.

The target frequency and/or amplitude may be differentially determined in respect of different parts of the object.

The frequency and/or amplitude of the projected electromagnetic radiation may be varied during the image capture such that different parts of the object are illuminated with electromagnetic radiation projected at respective target frequencies and/or amplitudes.

Guidance may be provided to a user which indicates a distance between the apparatus and the object to facilitate the target depth of scattering and/or target lateral distance of scattering.

The image of the object or the combined image of the object may be processed to filter directly reflected electromagnetic radiation from that which has undergone lateral subsurface scattering based on a distribution of illumination of the object.

The image of the object or the combined image of the object may be analysed to determine subsurface structure information.

The object imaged may be a body part of a user. A map of the user's subsurface blood vessels may be obtained from the image of the object or the combined image of the object. The user may be authenticated based on the obtained map.

According to various, but not necessarily all, embodiments there is provided examples as claimed in the appended claims.

According to various, but not necessarily all, embodiments there is provided a method comprising: capturing or causing capture of an image of an object using a rolling shutter; during the image capture, projecting or causing projection of electromagnetic radiation with a fixed-spatial distribution comprising a repeating pattern onto the object; and controlling timing of the rolling shutter and projection of the electromagnetic radiation to cause capture of first strips of the object when second strips, adjacent the first, are illuminated by denser regions of the repeating pattern, and to cause capture of the second strips while the projection of the electromagnetic radiation is turned off.

According to various, but not necessarily all, embodiments there is provided an apparatus comprising means for performing the method.

According to various, but not necessarily all, embodiments there is provided a computer program that, when run on a computer, performs the method.

According to various, but not necessarily all, embodiments there is provided a method comprising: capturing or causing capture of multiple spatially-offset images of an object as a relative position of the apparatus and object varies due to jitter; during the image captures, projecting or causing projection of electromagnetic radiation onto the object; and fusing or causing fusion of two or more of the spatially-offset images into a combined image of the object which comprises less of the projected electromagnetic radiation directly reflected from a surface of the object than either of the two or more spatially-offset images.

According to various, but not necessarily all, embodiments there is provided an apparatus comprising means for performing the method.

According to various, but not necessarily all, embodiments there is provided a computer program that, when run on a computer, performs the method.

BRIEF DESCRIPTION

Figure 2:
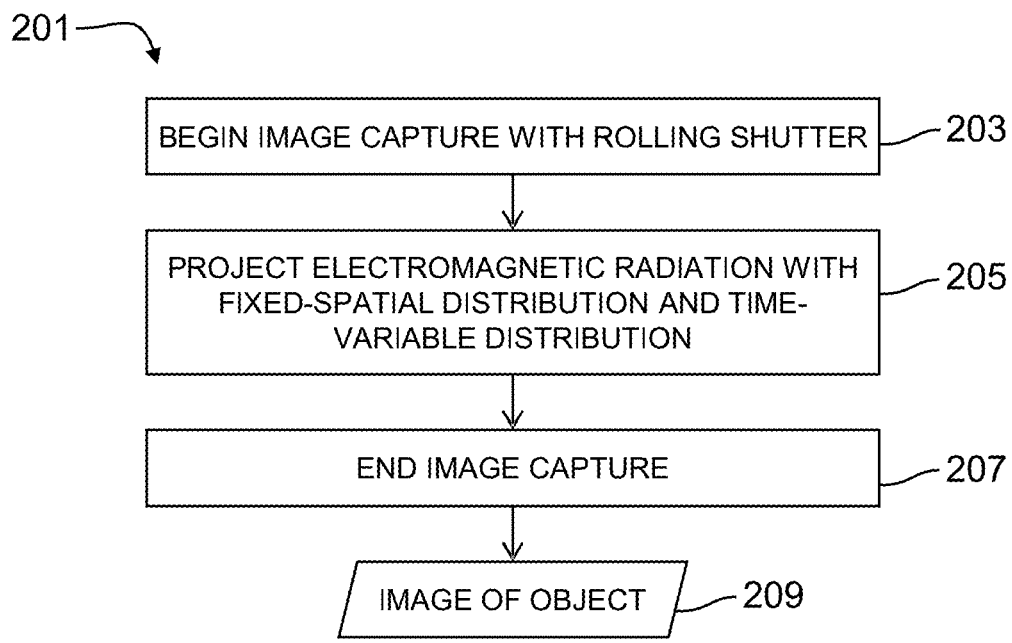
Figure 6A:
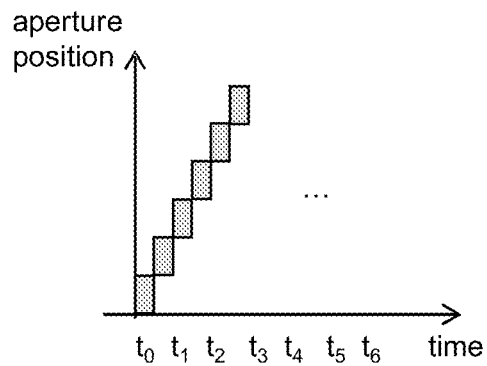
Figure 7A:
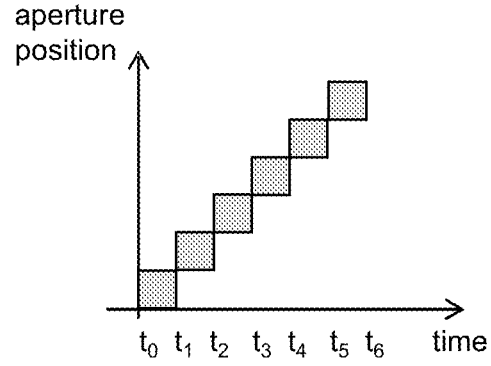
Figure 6B:
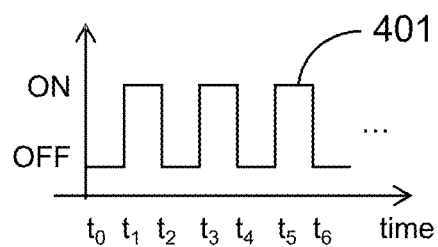
Figure 7B:
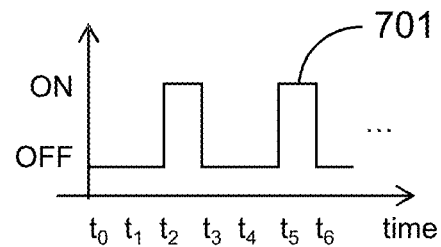
Figure 6C:
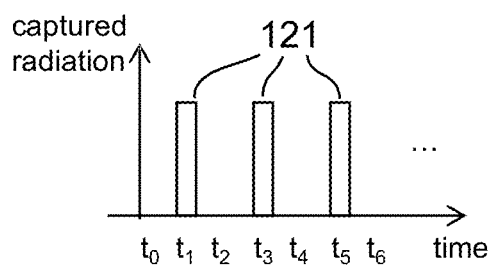
Figure 7C:
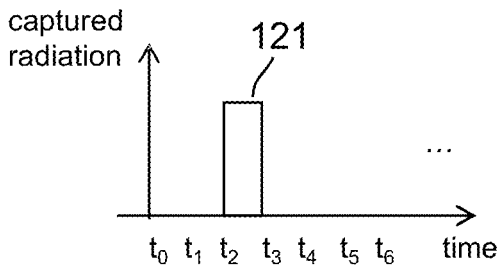
Figure 8:
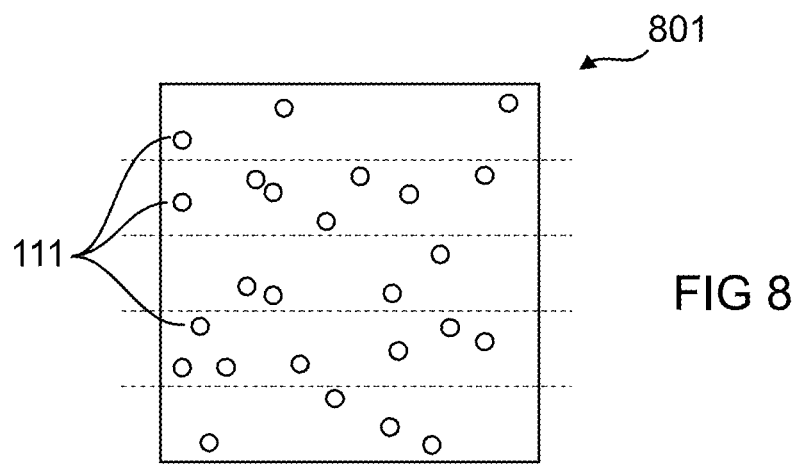
Figure 9A:
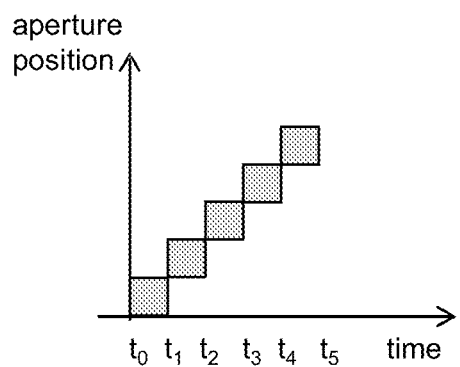
Figure 10A:
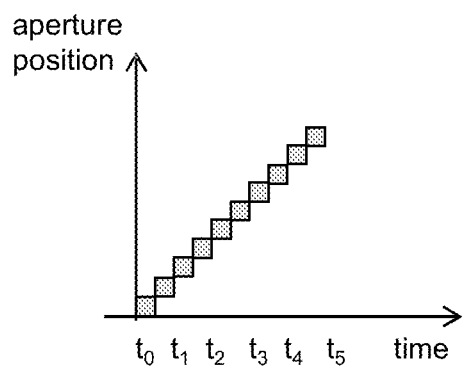
Figure 9B:
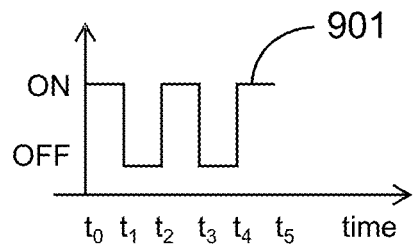
Figure 10B:
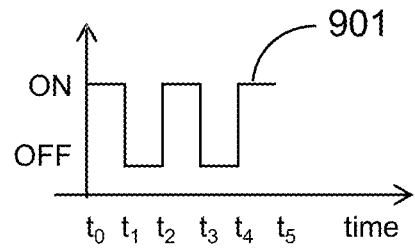
Figure 9C:
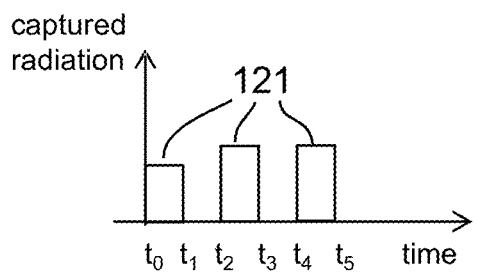
Figure 10C:
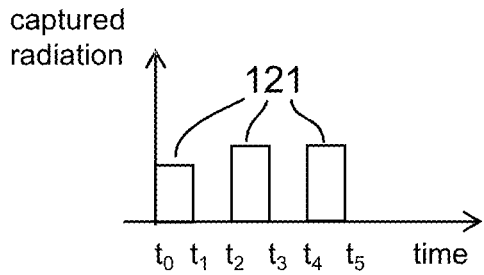
Figure 11A:
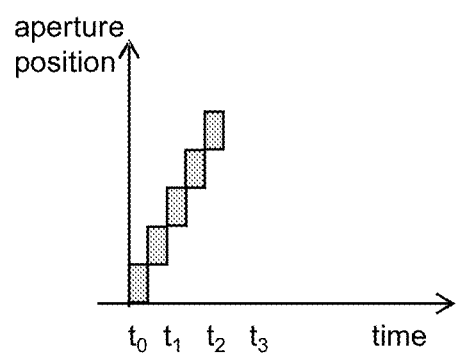
Figure 12A:
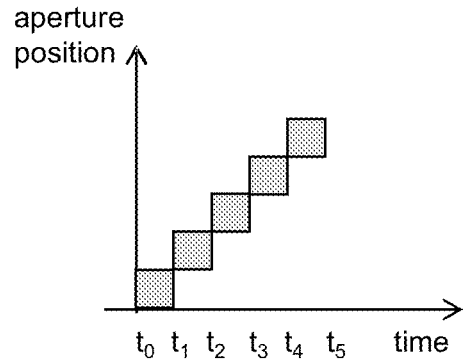
Figure 11B:
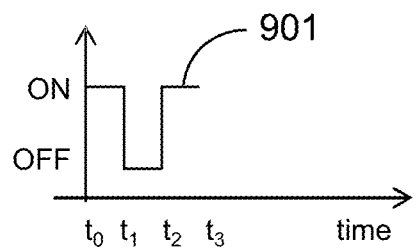
Figure 12B:
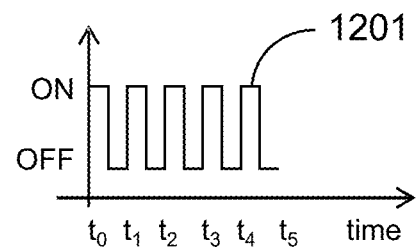
Figure 11C:
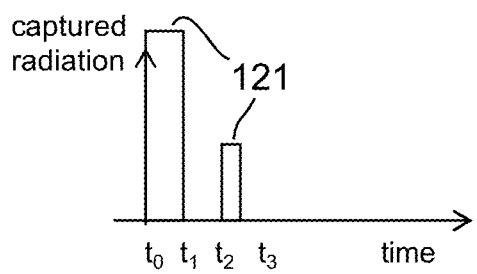
Figure 12C:
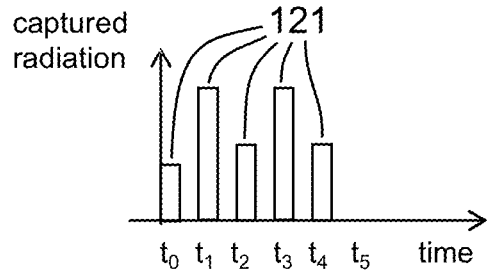
Figure 13:
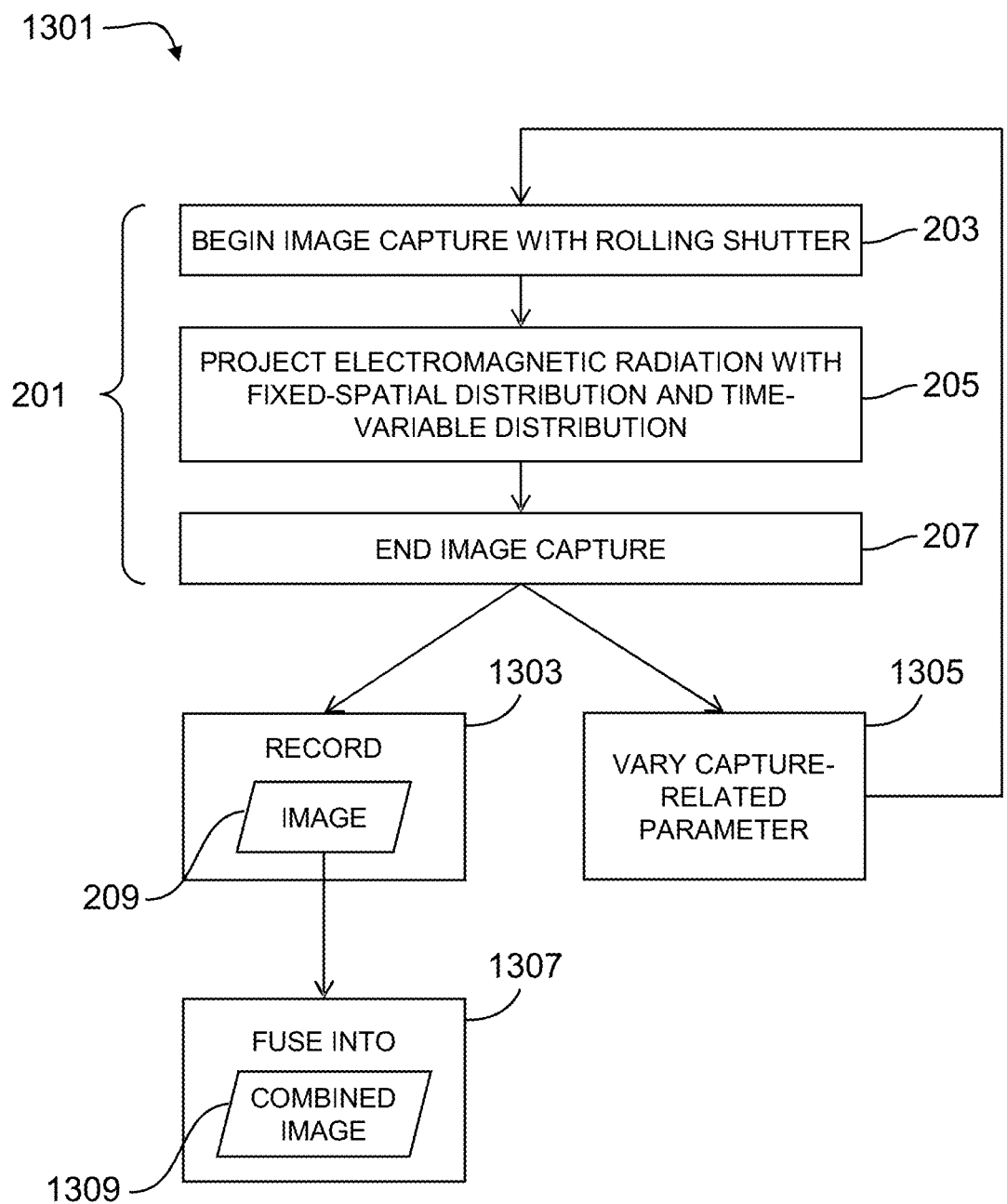
Figure 14A:
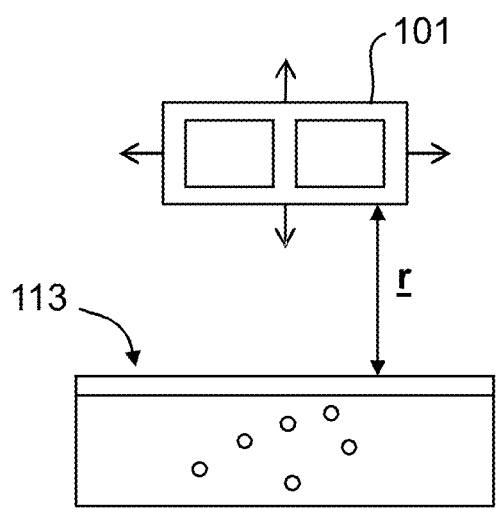
Figure 14B:
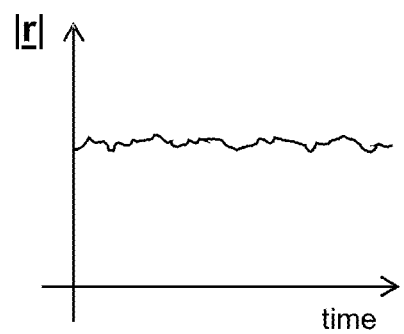
Figure 15A:
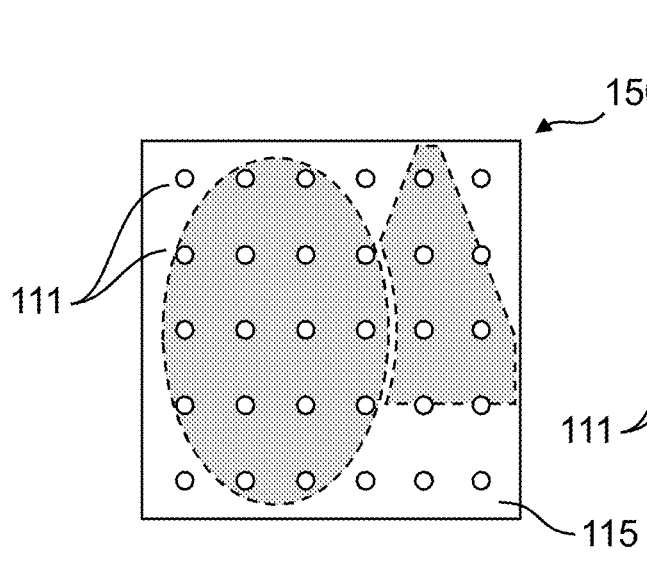
Figure 15B:
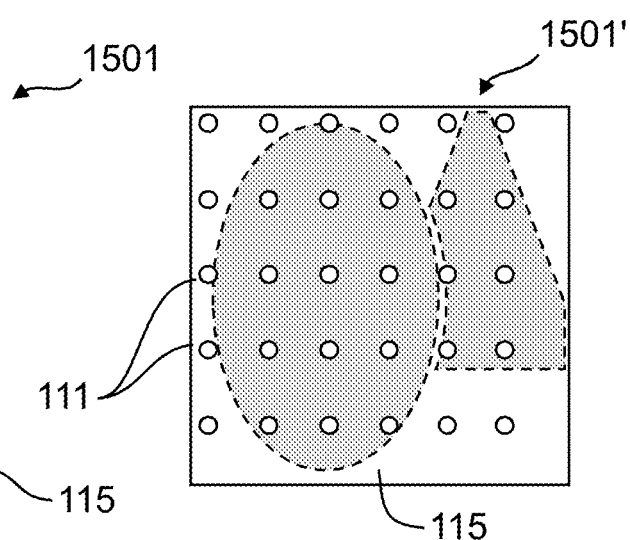
Figure 16:
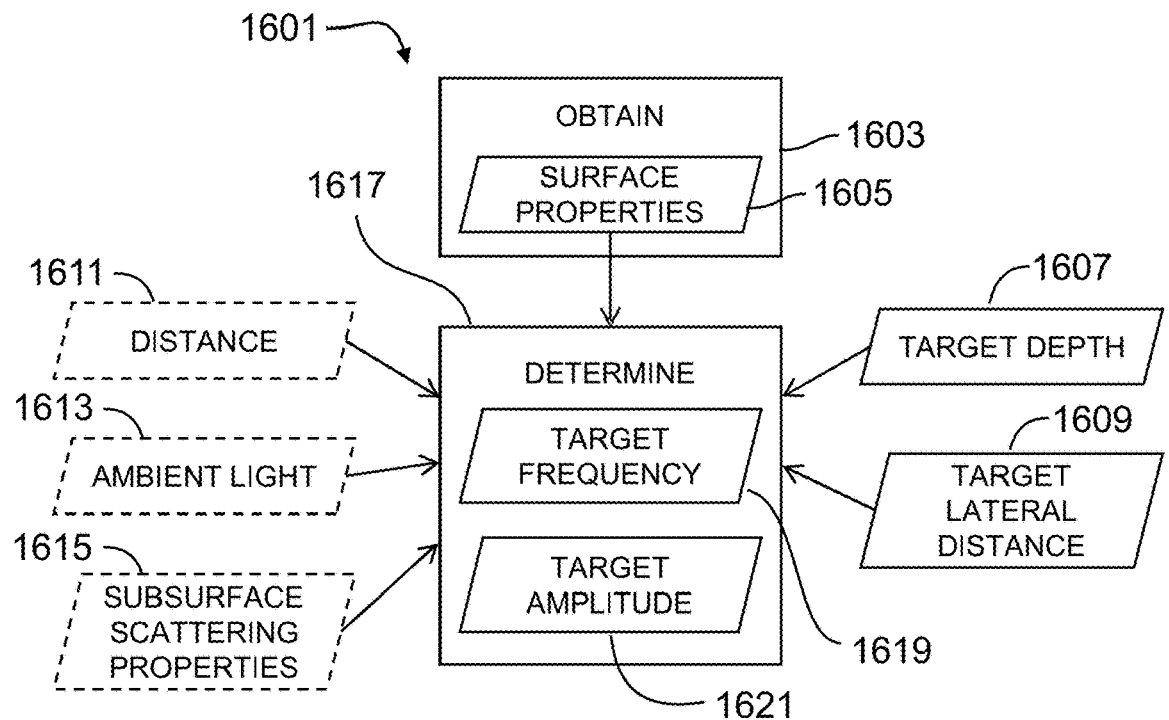
Figure 17:
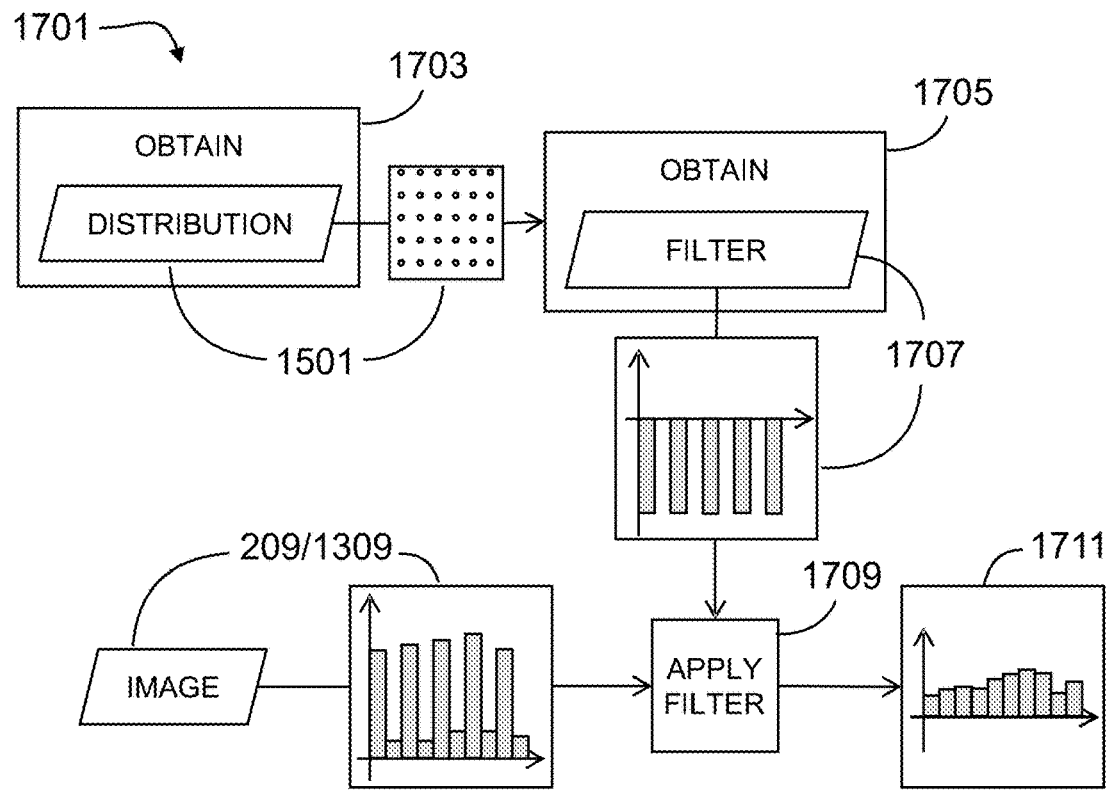
Figure 18:
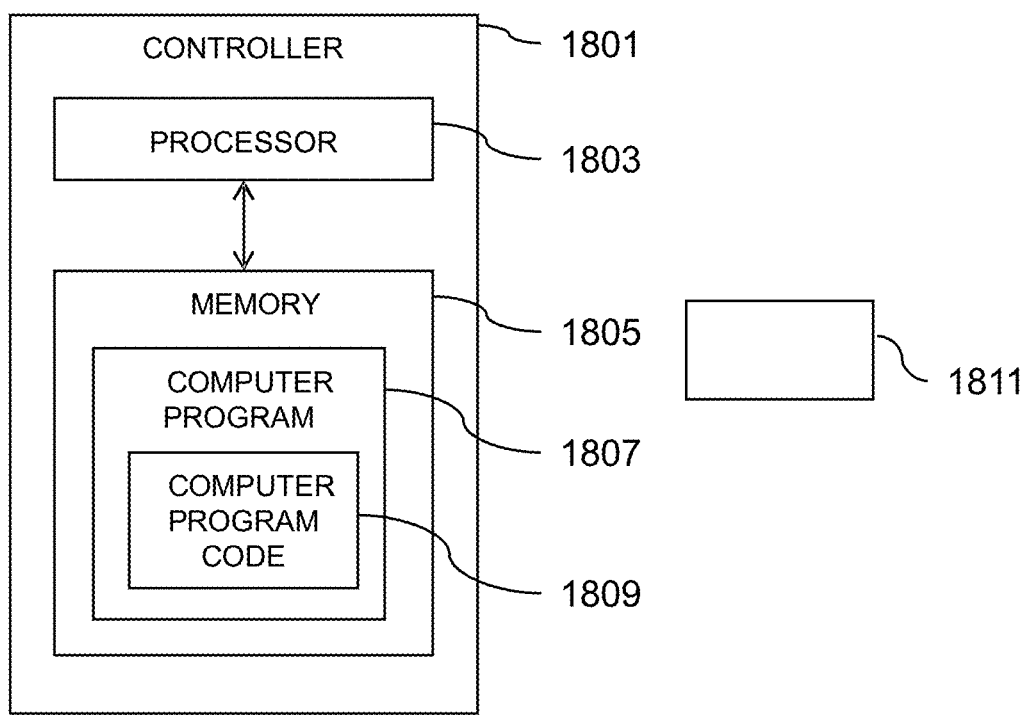

Some examples will now be described with reference to the accompanying drawings in which:

FIG. 1 shows an example apparatus;
FIG. 2 shows an example method;
FIG. 3 shows an illustrative example;
FIGS. 4A-C show another illustrative example;
FIGS. 5A-C show another illustrative example;
FIGS. 6A-C show another illustrative example;
FIGS. 7A-C show another illustrative example;
FIG. 8 shows another illustrative example;
FIGS. 9A-C show another illustrative example;
FIGS. 10A-C show another illustrative example;
FIGS. 11A-C show another illustrative example;
FIGS. 12A-C show another illustrative example;
FIG. 13 shows another example method;
FIGS. 14A-B show another illustrative example;
FIGS. 15A-B show another illustrative example;
FIG. 16 shows another example method;
FIG. 17 shows another example method; and
FIG. 18 shows an example controller.

DETAILED DESCRIPTION

FIG. 1 shows an example of an apparatus 101 comprising a camera 103 or any other suitable means for capturing an image of an object 113 and a projector 109 or any other suitable means for projecting electromagnetic radiation 111 onto the object 113.

The apparatus 101 may be or be comprised within a user device, such as a mobile phone or another portable computing device. The apparatus 101 may also comprise the controller 1801 illustrated in FIG. 18.

The camera 103 is operable in a rolling shutter mode. In the rolling shutter mode, an aperture 105 having a width which yields a field of view (FOV) 107 less than that of the camera 103 as a whole is scanned relative to the scene and image sensor(s). The rolling shutter mode may be implemented mechanically or electronically.

The projector 109 projects electromagnetic radiation 111 in fixed-spatial distribution. That is, the distribution in which the electromagnetic radiation 111 is projected is spatially invariant. Whenever the electromagnetic radiation 111 is projected, it is projected in the same spatial distribution.

In some, but not necessarily all, examples the fixed-spatial distribution of the projected electromagnetic radiation is a fixed distribution of dots. The projector 109 can be a dot projector. Micro-lenses can be used to simultaneously project the distribution of dots. The fixed-spatial distribution may take the form of other structured light. The projected electromagnetic radiation 111 may comprise one or more infrared frequencies. If so, the camera 103 comprises infrared sensors. The projected electromagnetic radiation 111 may comprise visible light. The projector 109 can be a transmitter in a LIDAR system.

The object 113 has a surface 115. A proportion of the projected electromagnetic radiation 111 will be directly reflected from the surface 115. The object also comprises a subsurface region 117 comprising subsurface structures 119 which may be of interest. A proportion of the projected electromagnetic radiation 111 will be scattered by subsurface structure 119 of the object 113. In this figure, the directly reflected electromagnetic radiation is referenced as 121 and the electromagnetic radiation which has undergone subsurface scattering is referenced as 123.

At a given aperture position of the rolling shutter, electromagnetic radiation 111 which is projected onto an area of the object 113 outside a field of view 107 from the aperture position can be captured when it has been scattered by subsurface structure 119 of the object 113 into the field of view 107. That is, electromagnetic radiation 111 which is projected onto an area of the object 113 outside a field of view 107 from the aperture position and which has undergone subsurface scattering into the field of view 107 can be captured.

Capture of the electromagnetic radiation 123 which has undergone subsurface scattering enables information about the subsurface structure 119 of the object 113 to be extracted, provided that the electromagnetic radiation 123 which has undergone subsurface scattering can be distinguished from the directly reflected electromagnetic radiation 121.

The apparatus 101 enables the capture of an image from which information about the subsurface structure 119 of the object 113 can be extracted.

FIG. 2 shows an example of a method 201 of operating the apparatus 101 to capture an image 209 in which information regarding the subsurface structure 119 of the imaged object 113 can be obtained. The method 201 enables such an image 209 to be obtained even when using a projector 109 which cannot vary the spatial distribution with which the electromagnetic radiation 111 is projected.

The method 201 comprises, at block 203, beginning the capture of an image 209 of the object 113 using a rolling shutter. The image capture begins at an initial aperture position and proceeds to multiple aperture positions, progressing at a rate dictated by the shutter scan speed, until reaching a final aperture position. The image sampling rate of the camera 103 may be synchronized with the aperture width and the shutter scan speed so as to capture the image 209 as a sequence of non-overlapping strips. These strips may each span fully a first dimension of the image 209, and collectively span a second dimension of the image 209.

During the image capture, according to block 205 of the method 201, electromagnetic radiation 111 is discontinuously projected. During the image capture the electromagnetic radiation 111 is at times projected and at other times not projected. It is projected with the fixed-spatial distribution, and in a time-variable distribution, onto the object 113.

That is, when the electromagnetic radiation 111 is projected during the image capture, it is projected in the same spatial distribution but whether it is projected or not at a given time varies with time during the image capture. Accordingly, some of the strips which collectively make up the image 209 may have been captured while the electromagnetic radiation 111 was projected onto the object 113 and some may have been captured while the electromagnetic radiation 111 was not projected.

In some examples the time-variable distribution of the projection of the electromagnetic radiation 111 comprises a temporally-alternating distribution such as, for example, strobing. The temporally-alternating distribution comprises a repeating on-cycle, during which the electromagnetic radiation 111 is projected, and a repeating off-cycle, during which the electromagnetic radiation 11 is not projected. The on-cycle may be of equal duration with the off-cycle as illustrated in FIG. 4B or may be of different duration to the off-cycle as illustrated in FIG. 7B.

In some examples the time-variable distribution comprises a temporal offset from the beginning of the image capture. For example, the image capture may begin and proceed for a time before the electromagnetic radiation 111 is strobed.

At block 207 of the method 201 the image capture ends and the image 209 of the object 113 is obtained. The image capture ends once a strip has been captured at the final aperture position.

In the method 201 settings of camera-related parameters, such as the aperture width and shutter scan speed, and projector-related parameters, such as the time-variable distribution, are such that adjustment of one or more of these would not decrease the proportion of projected electromagnetic radiation 111 captured which is directly reflected from the surface 115 of the object 113 (rays 121 illustrated in FIG. 1). Examples of adjustments and the effect on the proportion of electromagnetic radiation 111 captured which is directly reflected electromagnetic radiation 121 are shown in FIGS. 4A-C, 5A-C, 6A-C, 7A-C, 9A-C, 10A-C, 11A-C, and 12A-C.

The aforementioned adjustments are those which are realizable in view of constraints on the camera- and projector-related parameters. Constraints can include, for example: lower, and optionally upper, limits to the aperture width; upper, and optionally lower, limits to the shutter scan speed; rise and decay times for the projector 109; and, where relevant, maximum strobing frequency.

By operating the apparatus 101 during the image capture with the aforementioned camera- and projector-related parameters, more often than not during the image capture, the regions (strips) of the object 113 which are captured while the electromagnetic radiation 111 is projected are adjacent regions of the object 113 which are more densely illuminated by the projected electromagnetic radiation 111. Accordingly, the amount of electromagnetic radiation 111 which has undergone subsurface scattering into these regions increases relative to the amount which is directly reflected from the surface 115.

In some examples, the settings of the aforementioned parameters are subject to additional constraints. For example, the time-variable distribution and the shutter scan speed may be such that over periods of the time-variable distribution in which the electromagnetic radiation 111 is not projected (e.g., during off-cycle of a temporally-alternating distribution) the change in the aperture position is less than or equal to twice a target lateral distance for scattering. The target lateral distance for scattering is the lateral subsurface scattering distance that parameters of the projected electromagnetic radiation 111 such as the frequency and amplitude are controlled to achieve. As a result, projected electromagnetic radiation 111 incident on any part of the imaged region of the object 113 can be scattered by the subsurface structure 119 into the FOV 107 of the rolling shutter. Therefore, it is possible to obtain information about the subsurface structure 119 across the full extent of the imaged region of the object 113.

The time-variable distribution, aperture width and shutter scan speed may be fixed, selected from predetermined settings, or dynamically updated.

In examples in which the settings of the parameters are fixed, for example by the manufacturer, they may be fixed such that the proportion of the projected electromagnetic radiation 111 captured which is directly reflected from the surface 115 of the object 113 can be minimized when the apparatus 101 is positioned a specified distance away from the object 113. The user of the apparatus 101 may be instructed or guided to position the apparatus 101 at the specified distance from the object 113.

In other examples the method 201 comprises, prior to block 203, setting the time-variable distribution of the projected electromagnetic radiation 111, the aperture width of the rolling shutter and the shutter scan speed of the rolling shutter such that adjustment of one or more of these would not decrease the proportion of projected electromagnetic radiation 111 captured which is directly reflected from the surface 115 of the object 113. The settings can be determined from a look-up table. The look-up table may be indexed by the distance between the apparatus 101 and the object 113, which can be measured in real-time, and surface properties of the object 113. Alternatively, the settings may be calculated in real-time using a suitable optimization algorithm finding at least a local minimum in respect of an expected proportion of the projected electromagnetic radiation 111 to be captured which will be directly reflected electromagnetic radiation 121 by choosing a realizable time-variable distribution, aperture width and shutter scan speed.

For illustrative purposes and to advance understanding of the present disclosure, FIG. 3 shows a fixed-spatial distribution 301 of electromagnetic radiation 111 that an example of the projector 109 can produce and FIG. 8 shows a fixed-spatial distribution 801 of electromagnetic radiation 111 that another example of the projector 109 can produce. It will be appreciated that the present disclosure is not limited to the fixed-spatial distributions shown in FIGS. 3 and 8. For continued illustrative purposes FIGS. 4A-C show example settings according to which the method 201 may be performed with the fixed-spatial distribution 301 of FIG. 3. FIGS. 5A-C, 6A-C, and 7A-C show adjustments to those settings and the result of said adjustments. Likewise, FIGS. 9A-C show example settings according to which the method 201 may be performed with the fixed-spatial distribution 801 of FIG. 8. FIGS. 10A-C, 11A-C, and 12A-C show adjustments to those settings and the result of said adjustments.

The fixed-spatial distribution 301 of the projected electromagnetic radiation 111, as shown in FIG. 3, comprises a repeating pattern. In this example the repeating pattern is in the form of a grid of dots.

FIG. 4A shows the aperture position in the y-axis with respect to time in the x-axis.

Between times t0 and t1 the FOV 107 of the rolling shutter from the aperture position is aligned with a strip of the surface 115 onto which, if projected, the first row of dots in the fixed-spatial distribution 301 would be incident. There is no directly reflected electromagnetic radiation 121 in the FOV 107 of the rolling shutter from the aperture position between times t1 and t2. The FOV 107 in this aperture position is aligned with a blank inter-row strip in the fixed spatial distribution 301. In the example of FIG. 4A, the shutter scan speed and the aperture width are constant during the image capture.

FIG. 4B shows the time-variable distribution 401 in a manner which illustrates whether the electromagnetic radiation 111 is projected or not (ON or OFF) in the y-axis with respect to time in the x-axis. The electromagnetic radiation 111 is not projected between times t0 and t1 and is projected between times t1 and t2.

FIG. 4C shows the resulting amount of captured electromagnetic radiation 111 which is directly reflected from the surface 115 of the object 113. Since the electromagnetic radiation 111 is not projected at times when the FOV 107 of the rolling shutter is aligned with the regions (strips) of the surface 115 where the electromagnetic radiation 111 would be incident, no directly reflected electromagnetic radiation 121 is captured. The electromagnetic radiation 111 is projected at times when the FOV 107 of the rolling shutter is aligned with a region (strip) adjacent that which is illuminated, and thus electromagnetic radiation 123 which has undergone subsurface scattering is captured at each of these times.

In a general sense, it will be appreciated that the aperture width of the rolling shutter, the shutter scan speed of the rolling shutter and the time-variable distribution 401 are controlled to cause capture of the first strips of the object 113 when second strips, adjacent the first, are illuminated with denser regions of the repeating pattern and to cause capture of the second strips when the projection of the electromagnetic radiation 111 is turned off.

Consequently, in some examples, there is provided an apparatus 101 comprising means for: capturing an image 209 of the object 113 using a rolling shutter; during the image capture, projecting electromagnetic radiation 111 with a fixed-spatial distribution 301 comprising a repeating pattern onto the object 113; and controlling timing of the rolling shutter and projection of the electromagnetic radiation 111 to cause capture of first strips of the object 113 when second strips, adjacent the first, are illuminated by denser regions of the repeating pattern, and to cause capture of the second strips while the projection of the electromagnetic radiation 111 is turned off.

The effect is that the amount of projected electromagnetic radiation 111 which is incident on an area adjacent an imaged area (strip) of the object 113 at a given time is maximized while the amount of projected electromagnetic radiation 111 which is incident on the imaged area (strip) is minimized.

It should be noted that the aforementioned first strips are spaced from each other and the second strips are spaced from each other. The first and second strips alternate to form the full imaged area of the object 113. The strips are not necessarily of equal width. Each strip spans fully one dimension of the imaged area of the object 113.

FIGS. 5A-C show an example in which the aperture width is adjusted. In this case it is doubled with respect to the aperture width used in the example of FIGS. 4A-C. The shutter scan speed and the time-variable distribution 401 are not adjusted with respect to example of FIGS. 4A-C. The increased aperture width means that between, for example, times t1 and t2 the FOV 107 of the rolling shutter now encompasses a region (strip) of the surface 115 onto which the first row of the fixed-spatial distribution is incident. Accordingly, as shown in FIG. 5C, directly reflected electromagnetic radiation 121 is captured. Thus, with the adjustment of the aperture width, a proportion of electromagnetic radiation 111 captured which is directly reflected from the surface 115 of the object 113 is increased.

FIGS. 6A-C show an example in which the shutter scan speed is adjusted. In this case it is doubled with respect to the shutter scan speed used in the example of FIGS. 4A-C. The aperture width and the time-variable distribution 401 are not adjusted with respect to example of FIGS. 4A-C. The increased shutter scan speed means that between, for example, times t1 and t2, the FOV 107 is aligned with the region (strip) of the surface 115 onto which the first row of the fixed-spatial distribution 301 is incident for the first half of this time period. Accordingly, as shown in FIG. 6C, directly reflected electromagnetic radiation 121 is captured. Thus, with the adjustment of the shutter scan speed, a proportion of electromagnetic radiation 111 captured which is directly reflected from the surface 115 of the object 113 is increased.

FIGS. 7A-C show an example in which the time-variable distribution is adjusted. The adjusted time-variable distribution is referenced in this figure as 701. In this case, the adjustment to the time-variable distribution comprises a doubling of the duration of the off-cycle as compared to the time-variable distribution 401 used in the example of FIGS. 4A-C. The aperture width and the shutter scan speed are not adjusted with respect to example of FIGS. 4A-C. The increased duration of the off-cycle in the adjusted time-variable distribution 701 means that between, for example, times t2 and t3, the FOV 107 is aligned with the region (strip) of the surface 115 onto which the second row of the fixed-spatial distribution 301 is incident. Accordingly, as shown in FIG. 7C, directly reflected electromagnetic radiation 121 is captured. Thus, with the adjustment of the time-variable distribution with which the electromagnetic radiation 111 is projected, a proportion of electromagnetic radiation 111 captured which is directly reflected from the surface 115 of the object 113 is increased.

The fixed spatial distribution 801 of the projected electromagnetic radiation 111, as shown in FIG. 8, comprises a random distribution. In this example the random distribution is in the form of randomly distributed dots.

FIG. 9A shows the aperture position in the y-axis with respect to time in the x-axis.

Between times t0 and t1 the FOV 107 of the rolling shutter from the aperture position is aligned with a strip of the surface 115 onto which, if projected, the first three dots by distance from the top of the fixed-spatial distribution 801 would be incident. Between times t1 and t2 the FOV 107 of the rolling shutter from the aperture position is aligned with a strip of the surface 115 onto which, if projected, the next seven dots by distance from the top of the fixed-spatial distribution 801 would be incident.

In the example of FIG. 9A, the shutter scan speed and the aperture width are constant during the image capture.

FIG. 9B shows the time-variable distribution 901 in a manner which illustrates whether the electromagnetic radiation 111 is projected or not (ON or OFF) in the y-axis with respect to time in the x-axis. The electromagnetic radiation 111 is projected between times t0 and t1 and is not projected between times t1 and t2.

FIG. 9C shows the resulting amount of captured electromagnetic radiation 111 which is directly reflected from the surface 115 of the object 113.

FIGS. 10A-C show an example in which the aperture width is adjusted. In this case it is halved with respect to the aperture width used in the example of FIGS. 9A-C. The shutter scan speed and the time-variable distribution 401 are not adjusted with respect to example of FIGS. 9A-C. The reduced aperture width in this instance does not affect which dots in the fixed-spatial distribution 801 are captured as directly reflected electromagnetic radiation 121. Thus, with the adjustment of the aperture width, a proportion of electromagnetic radiation 111 captured which is directly reflected from the surface 115 of the object 113 is not decreased.

FIGS. 11A-C show an example in which the shutter scan speed is adjusted. In this case it is doubled with respect to the shutter scan speed used in the example of FIGS. 9A-C. The aperture width and the time-variable distribution 801 are not adjusted with respect to example of FIGS. 9A-C. The increased shutter scan speed means that between, for example, times t0 and t1, the FOV 107 is successively aligned with the region (strip) of the surface 115 onto which the first three dots and then the next seven dots of the fixed-spatial distribution 801 are incident. Accordingly, as shown in FIG. 11O, more directly reflected electromagnetic radiation 121 is captured. Thus, with the adjustment of the shutter scan speed, a proportion of electromagnetic radiation 111 captured which is directly reflected from the surface 115 of the object 113 is increased.

FIGS. 12A-C show an example in which the time-variable distribution is adjusted. The adjusted time-variable distribution is referenced in this figure as 1201. In this case, the adjustment to the time-variable distribution comprises a doubling of the strobing frequency and consequentially a halving of the duration of the on- and off-cycles as compared to the time-variable distribution 901 used in the example of FIGS. 9A-C. The aperture width and the shutter scan speed are not adjusted with respect to example of FIGS. 9A-C. The increased strobing frequency in the adjusted time-variable distribution 1201 means that the FOV 107 over the course of the image capture encompasses the regions illuminated by each dot in the fixed-spatial distribution 801 while they are illuminated. Accordingly, as shown in FIG. 12C, more directly reflected electromagnetic radiation 121 is captured. Thus, with the adjustment of the time-variable distribution with which the electromagnetic radiation 111 is projected, a proportion of electromagnetic radiation 111 captured which is directly reflected from the surface 115 of the object 113 is increased.

FIG. 13 shows an example of a method 1301 in which the apparatus 101 is used to capture multiple images 209.

Blocks 203, 205, and 207 of method 201 are repeated in the method 1301 to obtain multiple images 209. Block 1303 follows block 207, the end of a single image capture when a strip of the object 113 is captured at the final aperture position.

At block 1303 of the method 1301 the images 209 are recorded. The recording of images 209 may comprise only temporary recording, or it may comprise permanent recording or it may comprise both temporary recording and permanent recording. Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or overwritten, although long-term storage may or may not occur. The use of the term "capture" in relation to an image relates to temporary recording of the data of the image. The use of the term "store" in relation to an image relates to permanent recording of the data of the image.

At block 1305 of the method 1301, which also follows block 207, a capture-related parameter is varied before the method 201 is repeated. Accordingly, for different image captures, different capture-related parameters are used.

Examples of capture-related parameters that may be varied at block 1305 include, without limitation: a relative position of the apparatus 101 and object 113; a frequency and/or amplitude of the projected electromagnetic radiation 111; the time-variable distribution of the projected electromagnetic radiation 111; the aperture width of the rolling shutter; and/or the shutter scan speed of the rolling shutter.

Multiple images 209 of the object 113 can be captured and, from one image capture to another, a relative position of the apparatus 101 and object 113 is varied. This enables information about the full subsurface structure 119 to be obtained where the fixed-spatial distribution is too sparse (for example, the distance between adjacent dots is too great) to enable the capture of electromagnetic radiation 123 which has undergone subsurface scattering from certain parts of the subsurface structure 119 unless the fixed-spatial distribution is moved relative to the object 113. Examples of such sparse distributions may include, for example, those produced by rear facing LI DAR devices which are becoming integrated into smartphones.

Multiple images 209 of the object 113 can be captured and, from one image capture to another, a frequency and/or amplitude of the projected electromagnetic radiation 111 is varied. For different image captures, different frequencies and/or amplitudes of the projected electromagnetic radiation 111 are used. Subsurface scattering effects for certain subsurface structures 119 may be better realised with different frequencies or amplitudes of projected electromagnetic radiation 111.

Multiple images 209 of the object 113 can be captured and, from one image capture to another, the time-variable distribution of the projected electromagnetic radiation 111 is varied. For different image captures, different time-variable distributions of the projected electromagnetic radiation 111 are used.

Multiple images 209 of the object 113 can be captured and, from one image capture to another, the aperture width and/or the shutter scan speed of the rolling shutter is varied. For different image captures, different aperture widths and/or the shutter scan speeds of the rolling shutter are used.

At block 1307 of the method 1301 two or more images 209 are fused into a combined image 1309 of the object 113.

The combined image 1309 may comprise less directly reflected electromagnetic radiation 121 than either of the two or more images 209. The two or more images 209 may be selected from amongst those recorded in order that, when fused, the resultant combined image 1309 comprises less directly reflected electromagnetic radiation 121 than either of the two or more images 209. The manner in which two or more images 209 are fused may be configured to ensure that the resultant combined image 1309 comprises less directly reflected electromagnetic radiation 121 than either of the two or more images 209.

FIG. 14A shows an example of the apparatus 101 being moved in respect of the object 113 such that a relative position r of the apparatus 101 and the object 113 varies. The apparatus 101 repeats the method 201 while the relative position r of the apparatus 101 and the object 113 varies in order to capture multiple spatially-offset images 209 of the object 113.

The relative position r of the apparatus 101 and the object 113 may vary as a result of jitter. Jitter refers to motion that has high temporal frequency relative to the total time for the multiple image capture sequence. The variations in relative position r of the apparatus 101 and the object 113 due to jitter may be low magnitude, comparable to FOV 107 of the rolling shutter at a given aperture position. Jitter, as illustrated in FIG. 14B, can result from vibration in the apparatus 101 or camera 103, which can be deliberately induced by operation of actuators comprised in the apparatus 101, or can result from the unstable hand of a user of the apparatus 101. Accordingly, the present disclosure can opportunistically take advantage of the inherently unstable manner in which the user controls the relative position r of the apparatus 101 and the object 113 by capturing the multiple spatially-offset images 209 during jitter.

The effect of a variation in the relative position r of the apparatus 101 and the object 113 on the distribution 1501 of illumination, by the projected electromagnetic radiation 111, of the surface 115 of the object 113 is shown in FIGS. 15A and 15B where the distribution before the variation is referenced as 1501 and the distribution after the variation is referenced as 1501'.

As per block 1307 of the method 1301, two or more spatially-offset images can be fused into a combined image 1309 of the object which comprises less directly reflected electromagnetic radiation 121 than either of the two or more spatially-offset images.

Consequently, in some examples, there is provided an apparatus 101 comprising means for: capturing multiple spatially-offset images 209 of the object 113 as a relative position r of the apparatus 101 and object 113 varies due to jitter; during the image captures, projecting electromagnetic radiation 111 onto the object 113; and fusing two or more of the spatially-offset images 209 into a combined image 1309 of the object 113 which comprises less of the projected electromagnetic radiation 111 directly reflected from the surface 115 of the object 113 than either of the two or more spatially-offset images 209.

In some examples, subsurface structure information obtained from the multiple spatially-offset images 209 can be used to align the multiple spatially-offset images 209. Continuity of subsurface structures 119 can be expected. Therefore, even though differently located fragments of the subsurface structure 119 may be inferred from different ones of the multiple spatially-offset images 209, patterns can be predicted and the fragments can be mapped to the patterns to enable alignment.

FIG. 16 shows an example of a method 1601 of determining a target frequency and/or target amplitude for the projected electromagnetic radiation 111.

Block 1603 of the method 1601 comprises obtaining surface properties 1605 of the object 113.

Surface properties 1605 can include, for example, reflectance and absorption. Surface properties can be can be detected using a test illumination of the surface 115 or could be looked up based on knowledge of the object 113 being or to be imaged. Knowledge of the object 113 being or to be imaged can be obtained by, for example, computer vision.

At block 1617 of the method 1601 the target frequency 1619 and/or target amplitude 1621 for the projected electromagnetic radiation 111 is determined based on the surface properties 1605 and a target depth 1607 of scattering and/or target lateral distance 1609 of scattering. The target depth 1607 can be based on the type of object 113 to be imaged. The target lateral distance 1609 of scattering can be based on a distribution of illumination 1501 of the object 113 by the projected electromagnetic radiation 111.

Determining the target frequency 1619 and/or amplitude 1621 for the projected electromagnetic radiation 111 can be further based on a distance 1611 between the apparatus 101 and the object 113 and/or on ambient lighting conditions 1613. Guidance can be provided to a user which indicates a distance 1611 between the apparatus 101 and the object 113 to facilitate the target depth 1607 of scattering and/or target lateral distance 1609 of scattering.

Determining the target frequency 1619 and/or amplitude 1621 for the projected electromagnetic radiation 111 can be further based on subsurface scattering properties 1615 of a material from which the object 113 is composed. Subsurface scattering properties 1615 may be estimated from adjacent pixel values to the direct illumination locations.

FIG. 17 shows an example of a filtering method 1701 which processes the image 209 of the object 113 or the combined image 1309 of the object 113 to filter directly reflected electromagnetic radiation 121, in the event that any directly reflected electromagnetic radiation 121 is captured, from electromagnetic radiation 123 which has undergone lateral subsurface scattering based on the distribution 1501 of illumination of the object 113.

Block 1703 of the filtering method 1701 comprises determining the distribution 1501 of illumination of the object 113 by the projected electromagnetic radiation 111.

This can be achieved by acquiring an image of the object 113 as illuminated by the projected electromagnetic radiation 111, and processing the image to detect the distribution of illumination. In an alternative example, the distribution of illumination can be predicted given the known fixed-spatial distribution 301, 801 of the projected electromagnetic radiation 111 and the distance 1611 to the surface 115 of the object 113. The prediction may also take into account the geometry of the object's surface 115, with the distribution of illumination on the object's surface 115 being geometrically distorted, in comparison to the fixed-spatial distribution 301, 801 with which the electromagnetic radiation 111 was projected, due to the geometry of the surface 115.

At block 1705 of the method 1701 a filter 1707 is obtained based on the distribution 1501 of illumination.

At block 1709 of the method 1701 the filter 1707 is applied to the image 209 or the combined image 1309 of the object 113. The output of the application of the filter 1707 is an image 1711 composed from captured electromagnetic radiation 123 which has undergone subsurface scattering. Analysis can then be performed to determine subsurface structure information.

Knowledge of the distribution of illumination 1501 and capture-related parameters, such as the amplitude and frequency of the projected electromagnetic radiation 111, can be used in the analysis to determine the direction and distance travelled within the subsurface region 117 by electromagnetic radiation 123 which has undergone subsurface scattering into the FOV 107 at any given aperture position. The distance and direction of travel in the subsurface region 117 can be used to infer subsurface structure 119. For example, shadows cast by subsurface structures 119 can be detected from the decreased re-emission from the surface 115 at locations downstream of the location at which the projected electromagnetic radiation 111 is incident. Knowledge of the location at which the projected electromagnetic radiation 111 is incident enables the use of shadow information for resolving the location of subsurface structures 119. Furthermore, the penetration depth of the electromagnetic radiation 111 undergoing subsurface scattering may reduce as it moves laterally away from the location at which it was incident on the surface 115. The lateral distance between the detected location of the subsurface structure 119 and the location at which the electromagnetic radiation 111 was incident can therefore be used to give a range or estimate of the depth of at which the subsurface structure 119 is located.

The above described examples find application as enabling components of, for example, user authentication systems. For example, the object 113 imaged can be a body part of a user. Where the object 113 is a body part of a user, a map of the user's subsurface blood vessels (such as one or more of: veins, arteries, capillaries, etc.) can be obtained from the image 209 of the object 113 or the combined image 1309 of the object 113. The user can be authenticated based on the obtained map.

Access to at least one application can be controlled in dependence on whether or not the user is an authorised user. The at least one application may be a function or set of functions that the apparatus 101 is configured to perform or enable. Blood vessel structures of an authorised user can be recorded in the form of an addressable data structure that is retrievable from an addressable memory space and can therefore be stored and retrieved until deleted or overwritten, although long-term storage may or may not occur. The recorded blood vessel structures of an authorised user can be retrieved for comparison with the obtained map of the user's subsurface blood vessels. The comparison may be made using correlations, pattern recognition or any other suitable process. If the comparison shows a good match or correlation then access to at least one application can be permitted. If the comparison does not show a good match or correlation then access to at least one application can be denied.

The image capture of a body part of the user can be caused in response to a trigger event. The trigger event may be, for example, a user input to the apparatus 101, a predefined routine, or a request from one or more applications run on the apparatus 101. The request from the one or more applications may be made when authentication of the user is required in respect of access to the one or more applications.

The above described examples can also find application as enabling components of, for example, material analysis systems such as product authentication purpose including clothing material identification, food analysis or others. Subsurface analysis of food can reveal ripeness or spoilage. Subsurface analysis of skin can be used in health monitoring and disease diagnosis.

Although in the foregoing the settings of camera- and projector-related parameters have been described as minimising the proportion of captured electromagnetic radiation 111 which is directly reflected electromagnetic radiation 121 in the image 209, it is to be appreciated that only some parts of the object 113 may actually be of interest for the application in which the above described examples are used. In such instances, if the proportion of projected electromagnetic radiation 111 captured which is directly reflected from one or more surfaces 115 of one or more parts of the object 113 which are of interest can be minimised, then it will not matter if the overall proportion of captured electromagnetic radiation 111 which is directly reflected electromagnetic radiation 121 in the image 209 is not minimised.

Accordingly, in some examples the time-variable distribution of the projected electromagnetic radiation 111, the aperture width of the rolling shutter, and the shutter scan speed of the rolling shutter, are such that adjustment of one or more of these would not decrease the proportion of projected electromagnetic radiation 111 captured which is directly reflected from one or more surfaces 115 of one or more parts of the object 113 which are of interest.

Parts of the object 113 which are of interest can comprise those parts having subsurface structures 119 of interest. For example, parts of a user's face comprising differential blood vessel structures between different people may be considered parts of the face which are of interest. Examples of parts of a user's face that may be of interest include, without limitation: the skin above the top lip which holds the superior labial artery; the skin below the bottom lip which holds the inferior labial artery; and the areas to the left and right of the nose which hold the facial arteries.

Although in the foregoing the settings of camera- and projector-related parameters and of other capture-related parameters such as frequency and/or amplitude of the projected electromagnetic radiation 111 are consistent throughout a single image capture according to method 201, it is to be appreciated that subsurface scattering effects for certain subsurface structures 119 may be better realised with different settings. While one option is to capture multiple images 209 where settings are varied from one image capture to another, as described in relation to FIG. 13, another option is to vary the settings during the image capture.

For example, the shutter scan speed of the rolling shutter need not be constant during the image capture and, likewise, the aperture width of the rolling shutter need not be constant during the image capture.

In some examples the target frequency 1619 and/or amplitude 1621 can be differentially determined in respect of different parts of the object 113. The frequency and/or amplitude of the projected electromagnetic radiation 111 during the image capture can be varied such that different parts of the object 113 are illuminated with electromagnetic radiation 111 projected at respective target frequencies 1619 and/or amplitudes 1621.

FIG. 18 illustrates an example of a controller 1801. Implementation of the controller 1801 may be as controller circuitry. The controller 1801 may be implemented in hardware alone, have certain aspects in software including firmware alone or can be a combination of hardware and software (including firmware).

As illustrated in FIG. 18 the controller 1801 may be implemented using instructions that enable hardware functionality, for example, by using executable instructions of a computer program 1807 in a general-purpose or special-purpose processor 1803 that may be stored on a computer readable storage medium (disk, memory, etc.) to be executed by such a processor 1803.

The processor 1803 is configured to read from and write to the memory 1805. The processor 1803 may also comprise an output interface via which data and/or commands are output by the processor 1803 and an input interface via which data and/or commands are input to the processor 1803.

The memory 1805 stores a computer program 1807 comprising computer program instructions (computer program code 1809) that controls the operation of the apparatus 101 when loaded into the processor 1803. The computer program instructions, of the computer program 1807, provide the logic and routines that enables the apparatus 101 to perform the method 201 illustrated in FIG. 2 and optionally the methods illustrated in FIGS. 13, 16, and 17. The processor 1803 by reading the memory 1805 is able to load and execute the computer program 1807.

The apparatus 101 therefore comprises: at least one processor 1803; and at least one memory 1805 including computer program code 1809, the at least one memory 1805 and the computer program code 1809 configured to, with the at least one processor 1803, cause the apparatus 101 at least to perform: capturing 203 an image 209 of an object 113 using a rolling shutter having an aperture width and shutter scan speed; during the image capture, projecting 205 electromagnetic radiation 111 with a fixed-spatial 301, 801, time-variable 401, 901 distribution onto the object 113, wherein the time-variable distribution 401, 901 of the projected electromagnetic radiation 111, the aperture width of the rolling shutter, and the shutter scan speed of the rolling shutter, are such that adjustment of one or more of these would not decrease a proportion of projected electromagnetic radiation 111 captured which is directly reflected from a surface 115 of the object 113.

As illustrated in FIG. 18, the computer program 1807 may arrive at the apparatus 101 via any suitable delivery mechanism 1811. The delivery mechanism 1811 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 1807. The delivery mechanism may be a signal configured to reliably transfer the computer program 1807. The apparatus 101 may propagate or transmit the computer program 1807 as a computer data signal. In some examples the computer program 1807 may be transmitted to the apparatus 101 using a wireless protocol such as Bluetooth, Bluetooth Low Energy, Bluetooth Smart, 6LoWPan (IPv6 over low power personal area networks) ZigBee, ANT+, near field communication (NFC), Radio frequency identification, wireless local area network (wireless LAN) or any other suitable protocol.

In some examples there is provided computer program instructions 1809 for causing an apparatus 101 to perform at least the following or for performing at least the following: causing capture 203 of an image 209 of an object 113 using a rolling shutter having an aperture width and shutter scan speed; during the image capture, causing projection 205 of electromagnetic radiation 111 with a fixed-spatial 301, 801, time-variable 401, 901 distribution onto the object 113, wherein the time-variable distribution 401, 901 of the projected electromagnetic radiation 111, the aperture width of the rolling shutter, and the shutter scan speed of the rolling shutter, are such that adjustment of one or more of these would not decrease a proportion of projected electromagnetic radiation 111 captured which is directly reflected from a surface 115 of the object 113.

The computer program instructions 1809 may be comprised in a computer program 1807, a non-transitory computer readable medium, a computer program product, a machine readable medium. In some but not necessarily all examples, the computer program instructions 1809 may be distributed over more than one computer program 1807.

Although the memory 1805 is illustrated as a single component/circuitry it may be implemented as one or more separate components/circuitry some or all of which may be integrated/removable and/or may provide permanent/semi-permanent/dynamic/cached storage.

Although the processor 1803 is illustrated as a single component/circuitry it may be implemented as one or more separate components/circuitry some or all of which may be integrated/removable. The processor 1803 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIG. 2 and optionally those illustrated in FIGS. 13, 16, and 17 may represent steps in a method and/or sections of code in the computer program 1807. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

Consequently, in some examples, the apparatus 201 comprises means for: capturing 203 an image 209 of an object 113 using a rolling shutter having an aperture width and shutter scan speed; during the image capture, projecting 205 electromagnetic radiation 111 with a fixed-spatial 301, 801, time-variable 401, 901 distribution onto the object 113, wherein the time-variable distribution 401, 901 of the projected electromagnetic radiation 111, the aperture width of the rolling shutter, and the shutter scan speed of the rolling shutter, are such that adjustment of one or more of these would not decrease a proportion of projected electromagnetic radiation 111 captured which is directly reflected from a surface 115 of the object 113.

In some but not necessarily all examples, the apparatus 101 is configured to communicate data from the apparatus 101 with or without local storage of the data in a memory 1805 at the apparatus 101 and with or without local processing of the data by circuitry or processors 1803 at the apparatus 101.

The data may, for example, be the image 209, combined image 1309 or information about the subsurface structure 119 produced by the processing of the image 209 or combined image 1309.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long-range cellular radio links. The apparatus may comprise a communications interface such as, for example, a radio transceiver for communication of data.

The apparatus 101 may be part of the Internet of Things forming part of a larger, distributed network.

The processing of the data, whether local or remote, may be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the apparatus 101 where it may produce an output sensible to the user such as an audio output, visual output or haptic output.

Machine learning, which can include statistical learning, is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one" or by using "consisting".

In this description, reference has been made to various examples. The description of features or functions in relation to an example indicates that those features or functions are present in that example. The use of the term "example" or "for example" or "can" or "may" in the text denotes, whether explicitly stated or not, that such features or functions are present in at least the described example, whether described as an example or not, and that they can be, but are not necessarily, present in some of or all other examples. Thus "example", "for example", "can" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term "a" or "the" is used in this document with an inclusive not an exclusive meaning. That is any reference to X comprising a/the Y indicates that X may comprise only one Y or may comprise more than one Y unless the context clearly indicates the contrary. If it is intended to use "a" or "the" with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory including computer program code, the at least one memory and the computer program code configured to, with the at least one processor, cause the apparatus at least to:
   capture an image of an object using a rolling shutter having an aperture width and shutter scan speed;
   during the image capture, project electromagnetic radiation with a fixed-spatial, time-variable distribution onto the object,
   wherein the time-variable distribution of the projected electromagnetic radiation, the aperture width of the rolling shutter, and the shutter scan speed of the rolling shutter, are such that adjustment of one or more of these would not decrease a proportion of projected electromagnetic radiation captured which is directly reflected from a surface of the object;
   wherein the fixed-spatial distribution of the projected electromagnetic radiation comprises a repeating pattern, and wherein the at least one memory and the computer program code are configured to, with the at least one processor, further cause the apparatus to: control the time-variable distribution of the projected electromagnetic radiation, the aperture width of the rolling shutter, and the shutter scan speed of the rolling shutter to: cause capture of first strips of the object when second strips, adjacent the first, are illuminated by denser regions of the repeating pattern; and cause capture of the second strips while the projection of the electromagnetic radiation is turned off.

2. The apparatus of claim 1 wherein the at least one memory and the computer program code are configured to, with the at least one processor, further cause the apparatus to: capture, at a given aperture position of the rolling shutter, electromagnetic radiation which is projected onto an area of the object outside a field of view from the aperture position and which has undergone subsurface scattering into the field of view.

3. The apparatus of claim 1 wherein the at least one memory and the computer program code are configured to, with the at least one processor, further cause the apparatus to: set the time-variable distribution of the projected electromagnetic radiation, the aperture width of the rolling shutter, and the shutter scan speed of the rolling shutter, such that adjustment of one or more of these would not decrease the proportion of projected electromagnetic radiation captured which is directly reflected from a surface of the object.

4. The apparatus of claim 1 wherein the time-variable distribution and the shutter scan speed are such that over periods of the time-variable distribution in which the electromagnetic radiation is not projected the change in the aperture position is less than or equal to twice a target lateral distance for scattering.

5. The apparatus of claim 1 wherein the time-variable distribution of the projected electromagnetic radiation, the aperture width of the rolling shutter, and the shutter scan speed of the rolling shutter, are such that adjustment of one or more of these would not decrease the proportion of projected electromagnetic radiation captured which is directly reflected from one or more surfaces of one or more parts of the object which are of interest.

6. The apparatus of claim 1 wherein the at least one memory and the computer program code are configured to, with the at least one processor, further cause the apparatus to: capture multiple spatially-offset images of the object as a relative position of the apparatus and the object varies.

7. The apparatus of claim 6 wherein the multiple spatially-offset images are captured during jitter.

8. The apparatus of claim 6 wherein the at least one memory and the computer program code are configured to, with the at least one processor, further cause the apparatus to: fuse two or more spatially-offset images into a combined image of the object which comprises less of the projected electromagnetic radiation directly reflected from a surface of the object than either of the two or more spatially-offset images.

9. The apparatus of claim 1 wherein the at least one memory and the computer program code are configured to, with the at least one processor, further cause the apparatus to: capture multiple images of the object and to vary, from one image capture to another, one or more of: a frequency of the projected electromagnetic radiation; an amplitude of the projected electromagnetic radiation; the time-variable distribution of the projected electromagnetic radiation; the aperture width of the rolling shutter; or the shutter scan speed of the rolling shutter.

10. The apparatus of claim 1 wherein the at least one memory and the computer program code are configured to, with the at least one processor, further cause the apparatus to: obtain surface properties of the object; and, based on the surface properties and a target depth of scattering or target lateral distance of scattering, determine a target frequency and/or amplitude for the projected electromagnetic radiation.

11. The apparatus of claim 1 wherein the at least one memory and the computer program code are configured to, with the at least one processor, further cause the apparatus to: analyse the image of the object or the combined image of the object to determine subsurface structure information.

12. The apparatus of claim 1 wherein the object imaged is a body part of a user and the at least one memory and the computer program code are configured to, with the at least one processor, further cause the apparatus to: obtain, from the image of the object or the combined image of the object, a map of the user's subsurface blood vessels; and authenticate the user based on the obtained map.

13. A method comprising:
capturing an image of an object using a rolling shutter having an aperture width and shutter scan speed;
during the image capture, projecting electromagnetic radiation with a fixed-spatial, time-variable distribution onto the object,
wherein the time-variable distribution of the projected electromagnetic radiation, the aperture width of the rolling shutter, and the shutter scan speed of the rolling shutter, are such that adjustment of one or more of these would not decrease a proportion of projected electromagnetic radiation captured which is directly reflected from a surface of the object;
wherein the fixed-spatial distribution of the projected electromagnetic radiation comprises a repeating pattern, and wherein the method further comprises:
controlling the time-variable distribution of the projected electromagnetic radiation, the aperture width of the rolling shutter, and the shutter scan speed of the rolling shutter to: cause capture of first strips of the object when second strips, adjacent the first, are illuminated by denser regions of the repeating pattern; and
cause capture of the second strips while the projection of the electromagnetic radiation is turned off.

14. The method of claim 13, wherein the object imaged is a body part of a user and wherein the method further comprises: obtaining, from the image of the object or the combined image of the object, a map of the user's subsurface blood vessels; and authenticating the user based on the obtained map.

15. The method of claim 13 further comprising: analysing the image of the object or the combined image of the object to determine subsurface structure information.

16. A non-transitory computer readable medium comprising program instructions stored thereon for performing at least the following:
causing capture of an image of an object using a rolling shutter having an aperture width and shutter scan speed;
during the image capture, causing projection of electromagnetic radiation with a fixed-spatial, time-variable distribution onto the object,
wherein the time-variable distribution of the projected electromagnetic radiation, the aperture width of the rolling shutter, and the shutter scan speed of the rolling shutter, are such that adjustment of one or more of these would not decrease a proportion of projected electromagnetic radiation captured which is directly reflected from a surface of the object;
wherein the program instructions are further configured to cause:
controlling the time-variable distribution of the projected electromagnetic radiation, the aperture width of the rolling shutter, and the shutter scan speed of the rolling shutter to: cause capture of first strips of the object when second strips, adjacent the first, are illuminated by denser regions of the repeating pattern; and cause capture of the second strips while the projection of the electromagnetic radiation is turned off.

17. The non-transitory computer readable medium of claim 16, wherein the object imaged is a body part of a user, and wherein the program instructions are further configured to cause:
obtaining, from the image of the object or the combined image of the object, a map of the user's subsurface blood vessels; and authenticating the user based on the obtained map.

* * * * *